United States Patent Office 2,714,255
Patented Aug. 2, 1955

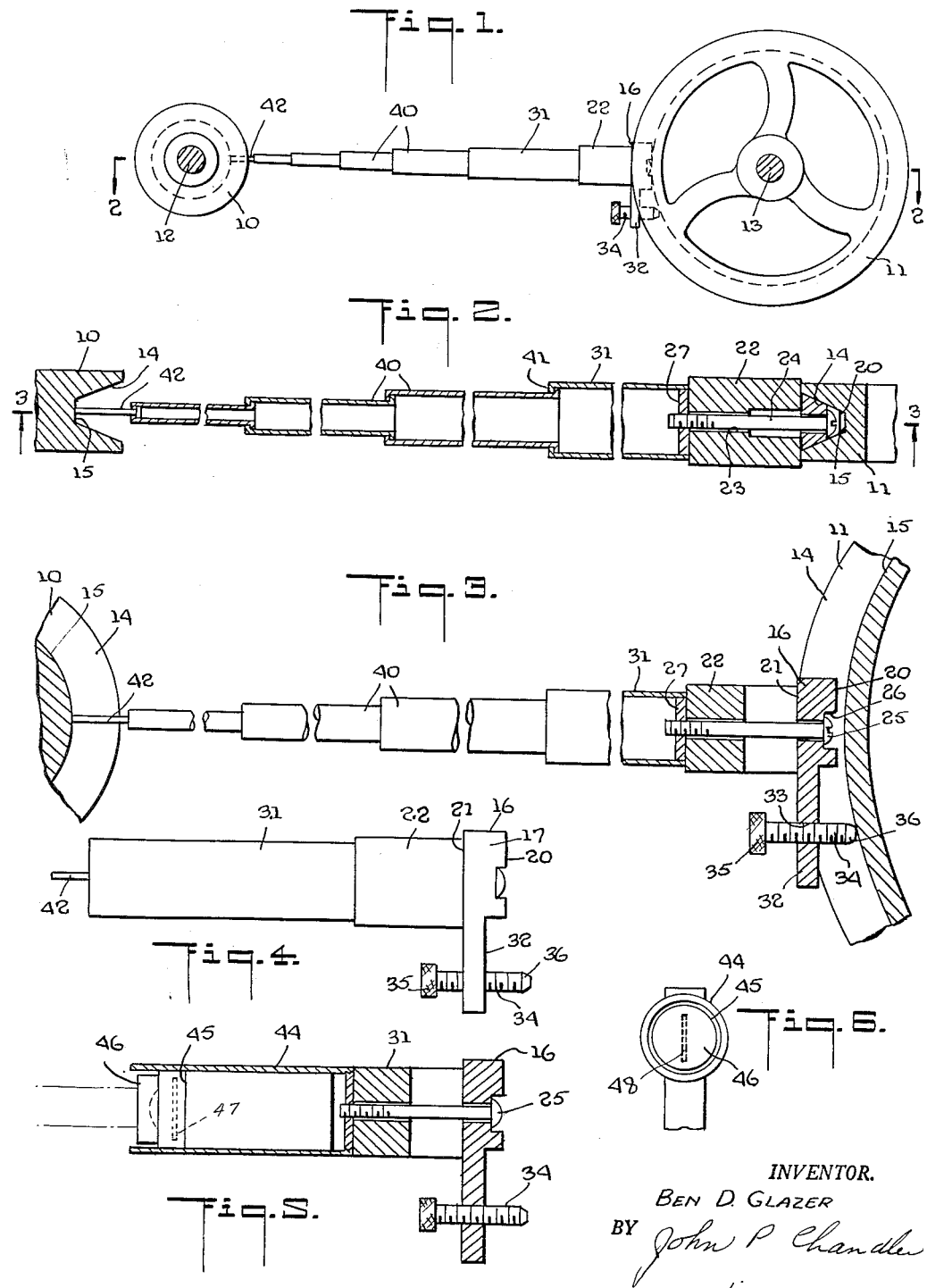

2,714,255

DEVICE FOR ALIGNING PULLEYS

Ben D. Glazer, Westbury, N. Y.

Application November 27, 1953, Serial No. 394,551

5 Claims. (Cl. 33—46)

This invention relates to pulley-aligning means and relates more particularly to a novel device for quickly aligning a pulley on one shaft with that on another in order to insure a smooth belt drive between two pulleys.

The device of the present invention has many uses and it is particularly useful in connection with motor driven compressors in refrigeration machines wherein the available space for performing the aligning operation is exceedingly limited and substantially perfect alignment is necessary to insure quiet and effective operation.

An important object of the present invention is to provide a novel device capable of quickly performing this function and comprising a tapered block which is firmly held in the groove of one pulley by means of a magnet and provided with an extensible element which can be accurately extended to the groove of the second pulley. This "extensible element" can be a telescopic rod or it may be a narrow beam of light from a suitable light source carried by the block.

Another object of the invention is to provide improved means for supporting the tapered block in pulleys of different diameters while maintaining the block perpendicular to the axis of the pulley upon which it is supported.

Yet another object of the invention is to provide a device of this character which is portable and which folds into a small area when not in use.

In the drawing:

Fig. 1 is a side elevation of two pulleys and showing the device of the present invention in use.

Fig. 2 is a broken section taken on line 2—2 of Fig. 1.

Fig. 3 is a broken section taken on line 3—3 of Fig. 2.

Fig. 4 is a side elevation of the device in retracted position.

Fig. 5 is a section taken through a modified form of the invention.

Fig. 6 is a front elevation thereof.

In Fig. 1 there is shown a side elevation of two pulleys 10 and 11 carried on shafts 12 and 13, one of which may be driven. One of the pulleys 11 has earlier been keyed to the shaft 13 and secured as by a set screw against longitudinal travel and the device of the present invention is affixed to this pulley while its extensible aligning element extends therefrom in the direction of the other pulley. Both pulleys have the usual external annular groove defined by opposed, non-parallel walls 14 and an interconnected base wall 15, thus giving it the V-shaped contour for use with the conventional V belt (not shown).

The aligning device of the present invention includes a block 16 having opposed, non-parallel faces 17 which are complemental to opposed walls 14 of the pulley groove and these walls are connected by an inner face 20, preferably of greater width than that of annular base wall 15 of the pulley groove. The block is so proportioned that its opposite or outer face 21 is flush with the outer peripheries of walls 14 of the pulley groove or at least that it does not extend beyond such peripheries. Thus, when the block is fitted in the pulley groove and is held there under the influence of a magnet it will have a tight fit characterized by a wedging action.

A permanent magnet 22 has a longitudinal bore 23 and a bolt 24 whose head 25 is disposed in a square milled slot 26 in the block, passes through the magnet and into an end wall 27 of the telescopic element including a cylindrical housing 31. Thus when the block is in the pulley groove the outer faces of the magnet firmly abut against the outer peripheral edges of the walls 14 forming the pulley groove.

The block has a lower extension 32 having a threaded opening 33 which receives a compensating screw 34 having a knurled head 35 and a tapered forward end 36. This screw compensates for differences in diameters of various pulleys upon which the device is used and it prevents any rocking motion of the supporting block during use of the device. In other words, if the pulley to which the block were applied were exceedingly large it would probably need no compensating screw, but the need for it increases as the diameter of the pulley decreases.

When the block is first applied to the pulley the tapered forward end 36 of the screw may be more or less plane with wall 20 of the block and as the screw is turned inwardly this tapered forward end is moved in the direction of the base of the pulley groove and the operator knows by feel when the block has achieved optimum stability. This forward end should have substantially the same taper as the opposed walls of the groove and its diameter should be substantially the same as the groove width at the base or root of the latter.

The device of the present invention will be equipped with a plurality of blocks of varying widths for use with pulleys of different groove widths and a block may be substituted for another by simply removing screw 24.

A powerful permanent magnet is preferable to an electro magnet since it is always ready for use but the latter may be used if desired.

The extensible element may include a plurality of tubular sections 40 of substantially the same length as housing 31. This latter should be relatively short in order to enable the device to be used if the pulleys are exceedingly close together in a given instance. The tubular sections 40 are of progressively smaller diameter and are provided with complemental annular shoulders 41 to limit outward travel. The final section 42 may be solid and be of small diameter and if desired a pointer may be provided which will act as an indicator. This final section is shown in partially extended position in Fig. 4.

The use of the device will be largely clear from the foregoing. The block is fitted preferably to the larger pulley and compensating screw 34 adjusted. The extensible element is then drawn outwardly until the final section touches the groove in the second pulley, at which time the pulley is adjusted longitudinally of the shaft until section 42 is in the center of the groove at which time the set screw is tightened and the work is completed.

In some instances one pulley, usually the driving pulley, may have an annular groove and the other pulley will have a flat periphery. In such an installation the device of the present invention will always be received in the grooved pulley.

In the modified form of the invention shown in Figs. 5 and 6 the telescopic element is replaced by a tube 44 containing a small flashlight 45 having a lens 46 and between the lens and the bulb a mask 47 is positioned, said mask having a vertical slot 48 of such width as to throw a narrow beam of light upon the center of the groove of the second pulley.

While two forms or embodiments of the invention have been shown and described herein for illustrative purposes,

What I claim is:

1. A device for aligning two grooved pulleys mounted on parallel shafts, said device including a block having opposed slanting faces shaped to generally fit the groove in one pulley and having an extension lying along the groove, an adjustable compensating screw carried by said extension and whose forward end is movable into the groove to an adjusted, fixed position in engagement with the bottom of the groove to compensate for pulleys of different diameters, a magnet carried by the block to secure the latter firmly in the groove and coacting with the periphery of the pulley, and a member carried by the magnet and capable of indicating a point in the groove of the second pulley.

2. A device for aligning two pulleys having generally V shaped annular grooves and mounted on parallel shafts, said device including a block having opposed slanting faces shaped to generally fit the groove in one pulley and having an extension lying along the groove, an adjustable member carried by said extension and whose forward end extends into the groove and into engagement with the bottom of the groove, a magnet carried by the block to secure the latter firmly in the groove and coacting with the periphery of the pulley, and an extensible member comprising a plurality of short, telescopic sections carried by the magnet and capable of being extended to the groove of the second pulley.

3. A device for aligning two pulleys, at least one of which has a generally V shaped annular groove, and mounted on parallel shafts, said device including a block having opposed slanting faces shaped to generally fit the groove in one pulley and having an extension lying along the groove, an adjustable compensating screw carried by said extension and whose forward end extends into the bottom of the groove, a permanent magnet carried by the block to secure the latter firmly in the groove and coacting with the periphery of the pulley, and an extensible element comprising a plurality of extensible, telescopic members carried by the magnet and capable of being extended to the second pulley to indicate a point on the periphery thereof.

4. A device for aligning two pulleys having generally V shaped annular grooves and mounted on parallel shafts, said device including a block having opposed slanting faces shaped to generally fit the groove in one pulley and whose connecting outer face does not extend beyond the periphery of the pulley, the block having an extension lying along the groove, an adjustable compensating screw carried by said extension and whose forward end extends into the groove and into engagement with the bottom of the groove, a magnet carried by the block to secure the latter firmly in the groove and coacting with the periphery of the pulley, a member carried by the magnet capable of being extended to the groove of the second pulley.

5. A device for aligning two pulleys, at least one of which is formed with an annular groove, said device including a block having opposed slanting faces shaped to generally fit the groove in one pulley and having an extension lying along the groove, an adjustable compensating screw carried by said extension and whose forward end extends into the groove and into engagement with the bottom of the groove, a magnet carried by the block to secure the latter firmly in the groove and coacting with the periphery of the pulley and means including a light source carried by the magnet to project a narrow beam of light to the center of the face of the second pulley.

References Cited in the file of this patent

UNITED STATES PATENTS

| Number | Name | Date |
|---|---|---|
| 575,671 | Watts et al. | Jan. 19, 1897 |
| 1,587,743 | Baker | June 8, 1926 |
| 1,888,454 | Edson | Nov. 22, 1932 |
| 2,256,527 | Ring | Sept. 23, 1941 |
| 2,306,677 | Ward | Dec. 29, 1942 |
| 2,435,085 | Judd | Jan. 27, 1948 |
| 2,553,571 | Frans et al. | May 22, 1951 |